F. C. BRUNHOUSE.
SPEED CHANGING MECHANISM.
APPLICATION FILED AUG. 23, 1909.

964,847.

Patented July 19, 1910.

Witnesses

Inventor.

UNITED STATES PATENT OFFICE.

FREDERICK C. BRUNHOUSE, OF PHILADELPHIA, PENNSYLVANIA.

SPEED-CHANGING MECHANISM.

964,847.  Specification of Letters Patent. Patented July 19, 1910.

Application filed August 23, 1909. Serial No. 514,145.

*To all whom it may concern:*

Be it known that I, FREDERICK C. BRUNHOUSE, a citizen of the United States, residing in Philadelphia, in the county of Philadelphia, State of Pennsylvania, have invented certain new and useful Improvements in Speed-Changing Mechanisms, of which the following is a specification.

My invention relates to speed changing mechanisms, designed for vehicles, such as automobiles, where variable speeds are required.

My object is to provide a device of this character wherein the mechanism for each of the variable speeds forward and that for the reverse are independent and absolutely direct from the driving shaft to the driven axle and controlled by a lever system by means of which such vehicles may be driven at any one of the several speeds forward and the reverse by the direction of a single hand lever of the selective type. This combination is arranged in a new and novel manner and is simplified so as to obtain durability, efficiency, compactness and the minimum of cost in construction.

I accomplish this by the means herein described and shown on the accompanying drawing.

Figure 1:
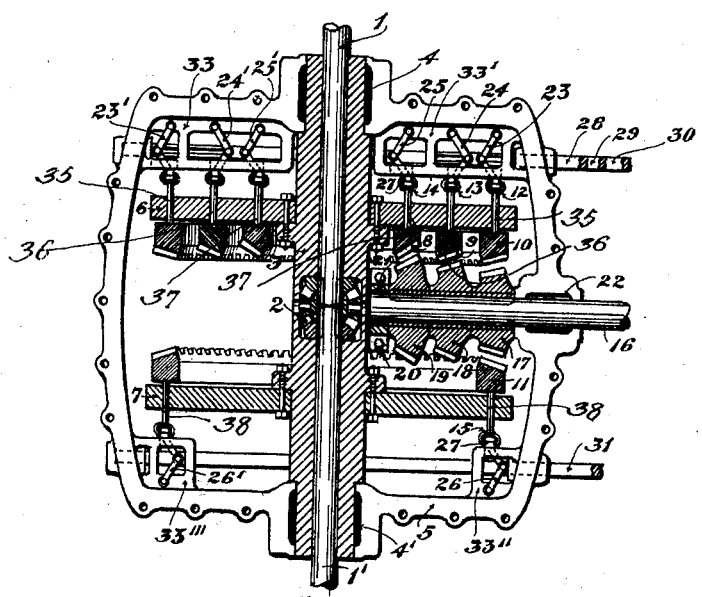
Figure 2:
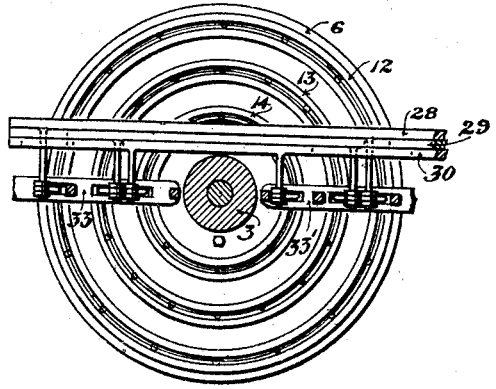
Figure 3:
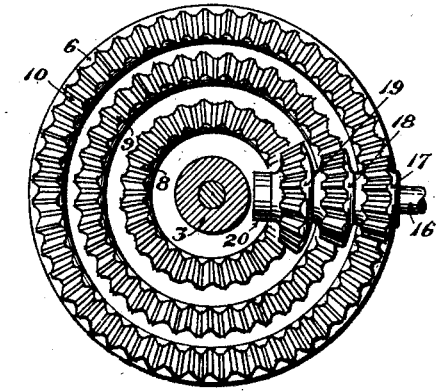

Figure 1 is a sectional view of the entire mechanism. Fig. 2 is a view of a detail of Fig. 1, showing the lever connections. Fig. 3 is a view of the annular gears and the bevel gears on the driving shaft engaging the same.

In Fig. 1 the driven shaft or axle is formed in the usual manner in two parts, 1, 1', connected by the differential mechanism 2, and inclosed by the differential case 3, the latter being rotatably mounted in the bearings 4, 4' in the gear casing 5. The disks 6 and 7 are secured to the differential case 3, the disk 6 carrying three annular gears 8, 9 and 10 concentrically arranged, representing the slow, intermediate and high speeds forward, and the disk 7 the annular gear 11 representing the reverse. The annular gears 8, 9 and 10 are adjustably mounted upon disk 6 by means of the series of pins 35, 36 and 37, the location of which is indicated in plan in Fig. 2. These pins are adapted to slide in suitable openings in the disk 6 and are secured at one end to the bases of annular gears 8, 9 and 10, and at the other to the grooved and flanged rings 12, 13 and 14, the function of which will be hereinafter set forth. In like manner the pins 38, slidable in the disk 7, carry the annular gear 11 and are secured to the grooved and flanged ring 15. The two-part, toggle-jointed links 23, 23', 24, 24', 25, 25', 26 and 26' are pivoted at one end upon the brackets 33, 33' 33'' and 33''', and are pivoted at their centers to the sliding rods 28, 29 and 30, while the other ends slidably engage the grooved and flanged rings 12, 13 and 14 at the ends of the gear pins. In like manner, the two-part links 26 and 26' are pivoted upon the frames 33'' and 33''', to the sliding rod 31 and are slidably connected to the grooved and flanged ring 15.

The driving shaft 16 is mounted in the bearing 21 of the bracket 20 and in the bearing 22 of the gear casing 5. The bevel gears 17, 18 and 19 are keyed to the driving shaft and are adapted to engage the annular gears 8, 9, 10 and 11.

Having thus set forth the component parts of my improved speed-changing mechanism, I will now describe the manner in which each of the forward speeds and the reverse is obtained.

Sliding rod 28, Fig. 1, actuates the two-part links 23 and 23', which operates through the connection of said links with the pins 35 to throw the annular gear 10 into positive contact with the bevel gear 17 on the power shaft. This gives the first or slow speed forward. In like manner either of the annular gears 9 or 8 may be brought into mesh with bevel gears 18 or 20, furnishing, correspondingly, the intermediate or the high speed forward. The sliding rod 29, through the two-part links 24 and 24', actuates the annular gear 9 to obtain the intermediate speed; and sliding rod 30, through the two-part links 25 and 25', renders the annular gear 8 positive, thus giving the high speed forward. Any well-known means may be employed to enable the two-part links to slidably engage the gear pins 35, 36, 37 and 38. For example, the end of the two-part link may be formed with an enlarged head fitting into a correspondingly tongued or grooved recess in the rings 12, 13, 14 and 15 on the ends of the gear pins, thus enabling the end to remain motionless while the disk 6, with its gears and pins, is in rotation. In order to obtain the reverse, the annular gear 11 is, by means of sliding rod 31, thrown on to pinion 17, the forward speed gear being first withdrawn.

The three sliding rods for the several forward speeds, as well as that for the reverse may be operated by a single lever of the selective type in the manner well known in automobile manufacture. This feature viz., the means whereby the forward speed and reverse sliding rods may be operated by a single lever constitutes consequently, no part of my invention.

What I claim as my invention and desire to secure by Letters Patent is—

1. In a speed-changing mechanism, a driving shaft, bevel gears of varying diameters secured thereon, a two-part driven shaft, a differential mechanism operatively connecting the two parts of said driven shaft, a differential case, a disk secured thereto, annular gears concentrically mounted upon said disk, pins secured to said annular gears and slidable in openings through said disk, and means for actuating said pins, substantially as described.

2. In a speed-changing mechanism, a driving shaft, low, intermediate and high speed bevel gears of varying diameters secured thereon, a two-part driven shaft, a differential mechanism operatively connecting the parts of said driven shaft, a differential case, a disk secured thereto, low, intermediate and high speed annular gears concentrically mounted upon said disk adapted to engage the low, intermediate and high speed gears on said driving shaft, and means for independently engaging each of said annular gears with its appropriate bevel gear, said means consisting of pins slidably mounted in said disk and secured to the bases of said annular gears and means for actuating said pins, substantially as described.

3. In a speed-changing mechanism, a driving shaft, bevel gears of different diameters secured thereon, a two-part driven shaft, a differential mechanism operatively connecting said two-part driven shaft, a differential case, means for imparting a low, intermediate or high forward speed to said differential casing, said means consisting of a disk secured to said differential case, annular gears concentrically arranged upon said disk, pins secured to the base of said annular gears and sliding in seats formed through said disk, links adapted to actuate said pins, and sliding rods to actuate said links; and means for imparting a reverse revolution to said differential casing, said means consisting of a disk secured to said differential case and an annular gear mounted thereon and movable into engagement with one of the bevel gears upon said driving shaft in the manner hereinabove set forth with respect to the forward speeds, substantially as described.

In testimony whereof I herewith affix my signature in the presence of two witnesses.

FREDERICK C. BRUNHOUSE.

Witnesses:
 FRANK B. STOCKLEY,
 F. R. GILLINDER.